US008672380B2

(12) United States Patent
Carter et al.

(10) Patent No.: US 8,672,380 B2
(45) Date of Patent: Mar. 18, 2014

(54) HANDHOLD ASSEMBLY

(75) Inventors: Zachary R. Carter, Decatur, IL (US); Scott M. Hauser, Columbia Heights, MN (US)

(73) Assignee: Caterpillar Inc., Peoria, IL (US)

(*) Notice: Subject to any disclaimer, the term of this patent is extended or adjusted under 35 U.S.C. 154(b) by 6 days.

(21) Appl. No.: 13/421,900

(22) Filed: Mar. 16, 2012

(65) Prior Publication Data

US 2013/0241242 A1    Sep. 19, 2013

(51) Int. Cl.
E04G 5/14    (2006.01)

(52) U.S. Cl.
USPC .......... 296/1.02; 16/422; 182/113; 211/85.18

(58) Field of Classification Search
USPC .............. 16/422, 424, 419, 420; 135/65; 182/106, 108, 113; 211/70.8, 85.18, 211/60.1, 70.6, 4; 296/1.02
See application file for complete search history.

(56) References Cited

U.S. PATENT DOCUMENTS

| | | | |
|---|---|---|---|
| 3,637,046 A * | 1/1972 | Emmons | 182/170 |
| 3,848,785 A * | 11/1974 | Bott | 224/319 |
| 4,626,016 A | 12/1986 | Bergsten | |
| 5,154,241 A | 10/1992 | Comer et al. | |
| 5,205,603 A | 4/1993 | Burdette, Jr. | |
| 5,561,960 A | 10/1996 | Minnick et al. | |
| 5,813,663 A | 9/1998 | Victor et al. | |
| 6,053,281 A | 4/2000 | Murray | |
| 6,185,875 B1 | 2/2001 | Victor | |
| 6,328,285 B1 * | 12/2001 | Wiseman | 256/59 |
| 6,340,189 B1 | 1/2002 | Pordy | |
| 6,578,666 B1 | 6/2003 | Miller | |
| 6,799,353 B1 | 10/2004 | Stewart | |
| 2006/0278472 A1 * | 12/2006 | Kenton et al. | 182/113 |
| 2009/0322052 A1 | 12/2009 | Ruehl | |
| 2011/0204109 A1 * | 8/2011 | Knutson et al. | 224/405 |

FOREIGN PATENT DOCUMENTS

WO    2012017296    2/2012

* cited by examiner

Primary Examiner — Dennis Pedder

(57) ABSTRACT

A handhold assembly for a machine chassis includes a handhold and a mounting structure. The handhold includes a gripping member, an elongate member extending from the gripping member, and a locking member provided at a distal portion of the elongate member. Further, an adapter provided at a distal end of the elongate member. The mounting structure is configured to be attached with the machine chassis and includes a first opening and a second opening. The first and the second openings configured to removably receive the elongate member and the adapter, respectively. Further, a slot provided on the first opening, the slot configured to engage with the locking member of the handhold.

15 Claims, 5 Drawing Sheets

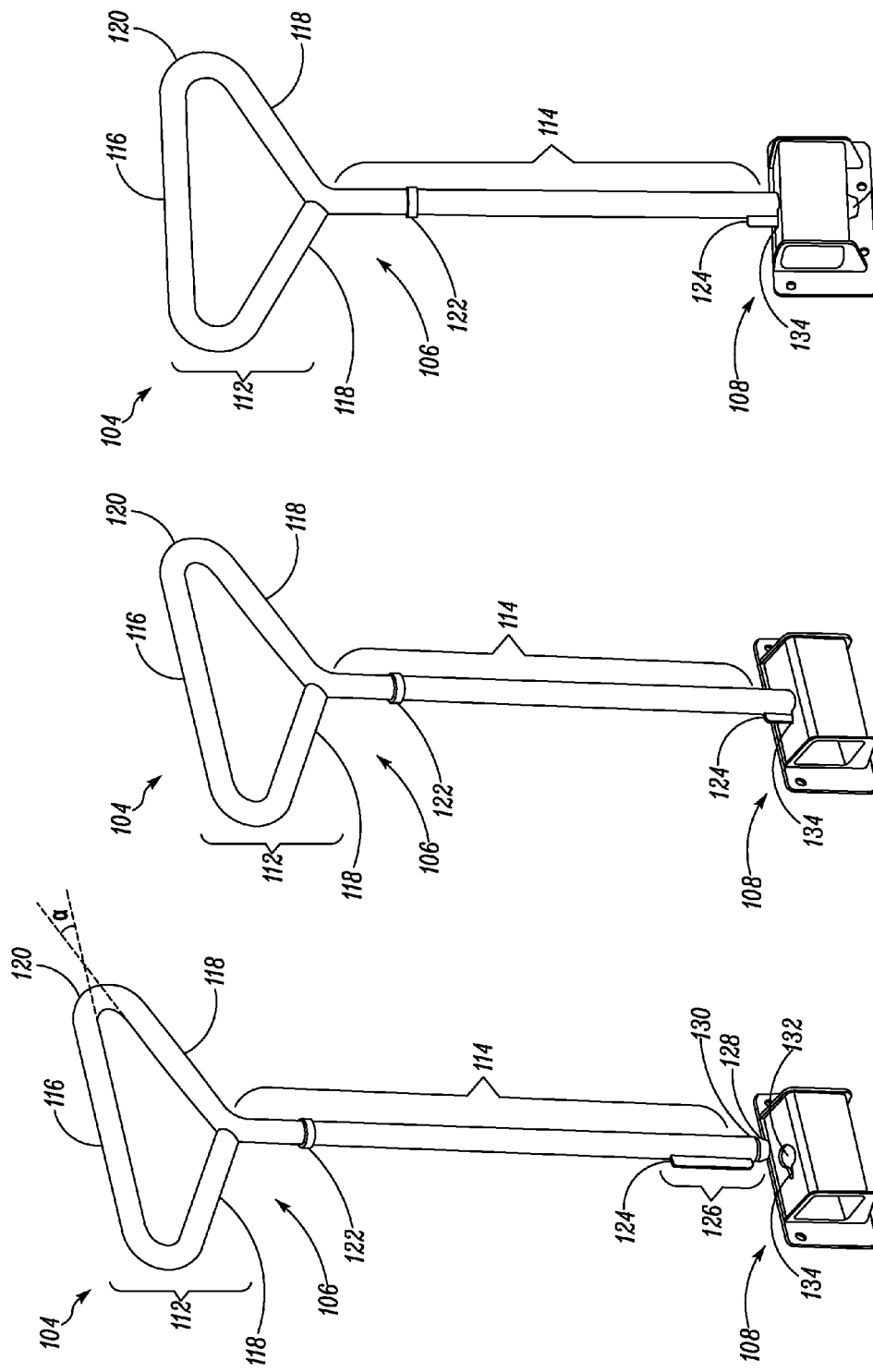

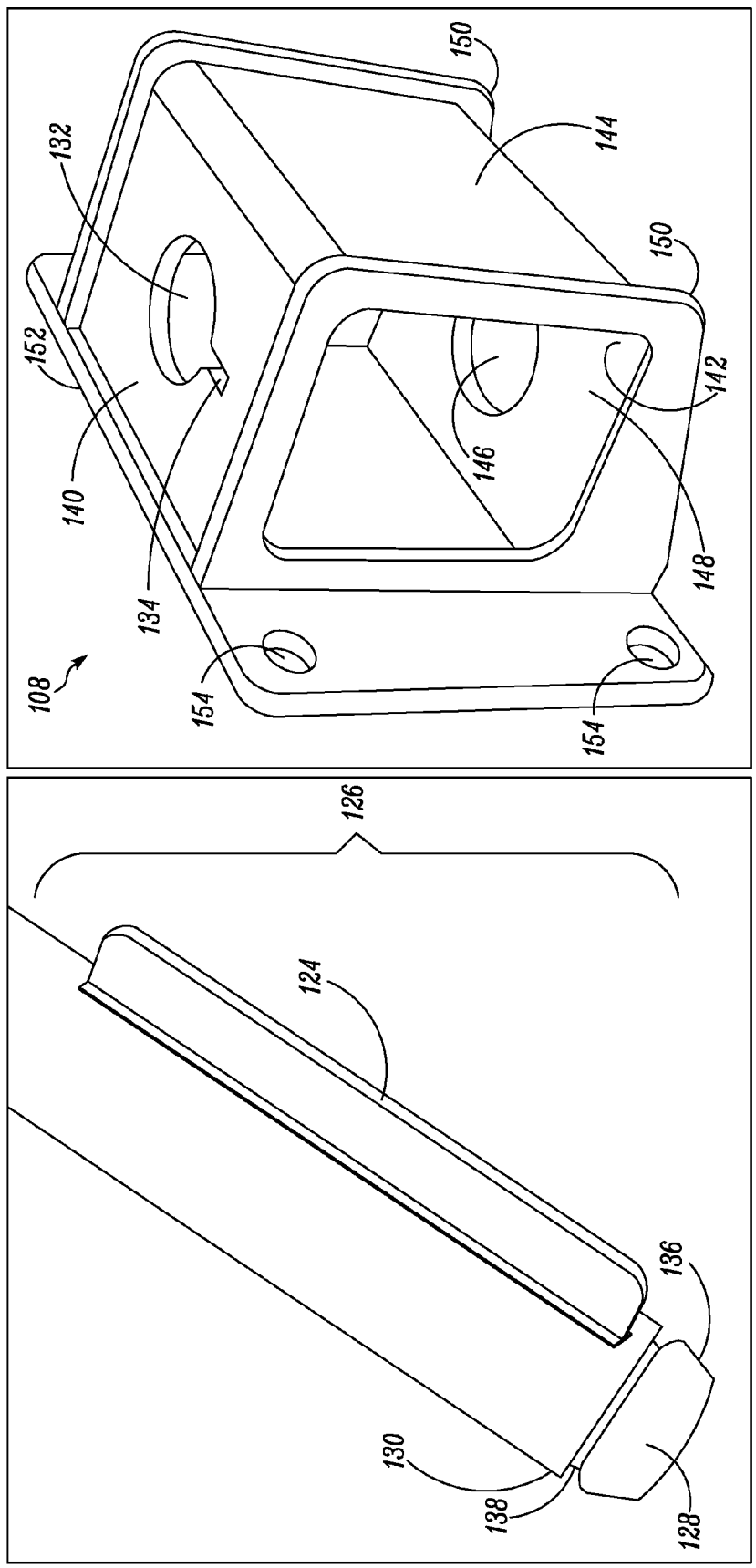

HANDHOLD ASSEMBLY

TECHNICAL FIELD

The present disclosure relates to a handhold assembly for a machine chassis, and more particularly to a handhold assembly required for heavy duty machines chassis like large mining trucks, dump trucks etc.

BACKGROUND

A handhold assembly is used for traversing across a machine chassis. For example, U.S. Pat. No. 6,328,285 relates to a handrail apparatus that is permanently attached to a collapsible support system and is rotatable so as to allow the handle portion of the rail apparatus to move between various positions. This enables the support structure to be placed in a storage position without removing the handrail apparatus. Such a handrail apparatus would also be capable of being placed within the interior of the support surface, not just at the edges, so as to provide support to users while ascending and descending the support structure.

SUMMARY

In one aspect, the present disclosure describes a handhold assembly for a machine chassis. The handhold assembly includes a handhold and a mounting structure configured to be attached with the machine chassis. The handhold includes a gripping member, an elongate member extending from the gripping member, and a locking member provided at a distal portion of the elongate member. The handhold further includes an adapter provided at a distal end of the elongate member. Also, the mounting structure includes a first opening and a second opening. The first and the second openings are configured to removably receive the elongate member and the adapter, respectively. Moreover, a slot is provided on the first opening. The slot is configured to engage with the locking member, provided at the distal portion of the elongate member.

In another aspect, the present disclosure describes the machine chassis including a frame. The machine chassis further includes a storage assembly configured to store the handhold. The mounting structure and the storage assembly are attached to the frame.

Other features and aspects of this disclosure will be apparent from the following description and the accompanying drawings.

BRIEF DESCRIPTION OF THE DRAWINGS

FIGS. 2-4 illustrate perspective views of the handhold assembly in various configurations, according to an aspect of the present disclosure;

FIG. 5 is a perspective view of an adapter, according to an aspect of the present disclosure;

FIG. 6 is a perspective view of a mounting structure, according to an aspect of the present disclosure;

DETAILED DESCRIPTION

The present disclosure relates to a handhold assembly which assists a servicing personnel or an operator for traversing across a machine chassis from one end to another. Further, the machine chassis includes a handhold storage assembly to store the handholds while not in use.

Figure 1:
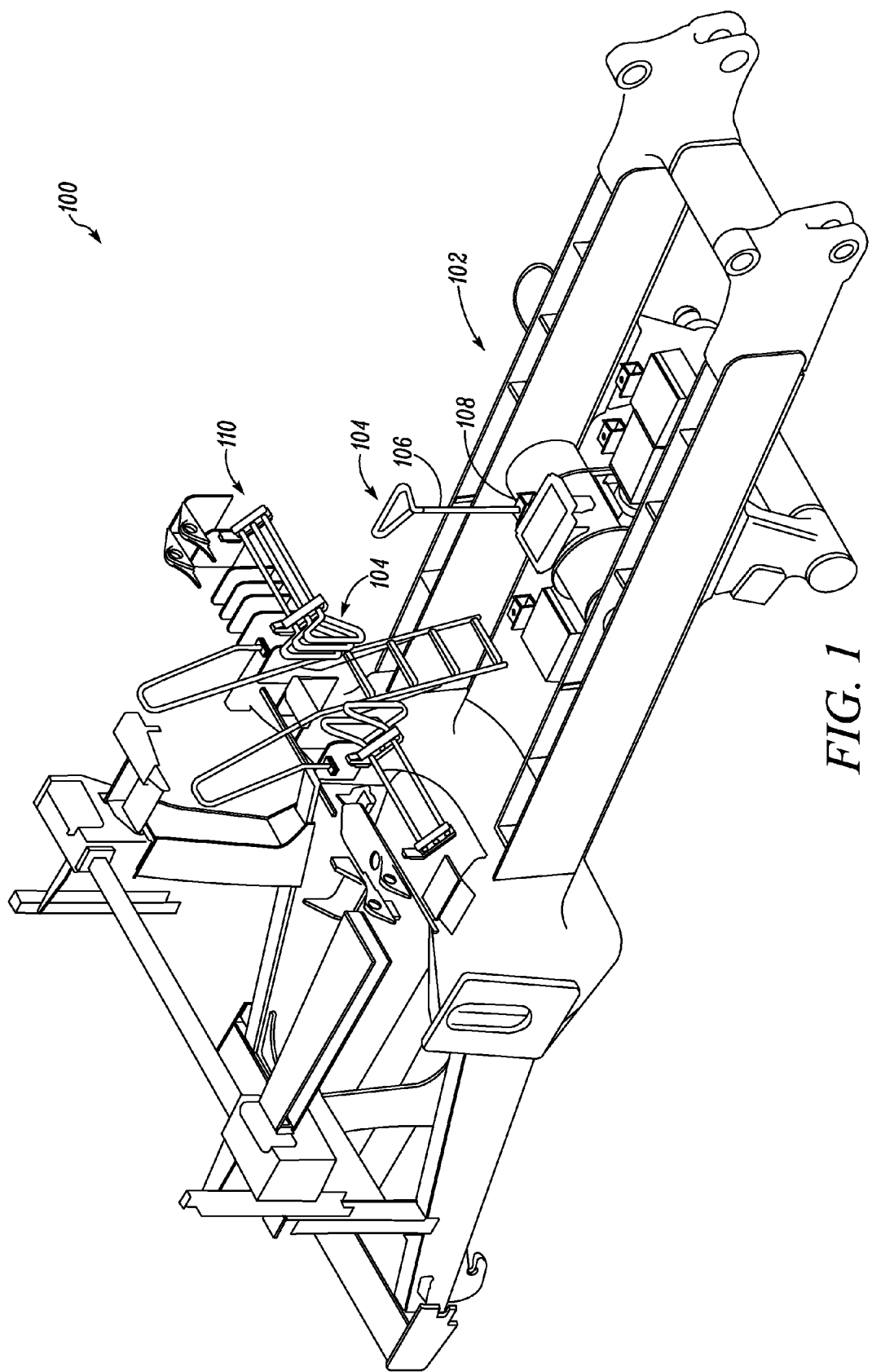
FIG. 1 illustrates a perspective view of a machine chassis with a hand hold assembly, according to an aspect of the present disclosure.

FIG. 1 illustrates a perspective view of the machine chassis 100 in accordance with an embodiment of the present disclosure. Although, the machine chassis 100 may be embodied as an off-highway truck chassis, those skilled in the art will understand that the present disclosure may be applicable to other types of machines, for example, articulated trucks, backhoe loaders, wheel loaders, wheel dozers, cold planers, and the like. The machine chassis 100 includes a frame 102 to support various parts of the machine like an engine, a transmission, a driveshaft, a suspension mechanism, wheels, cab etc.

According to an aspect of the present disclosure, one or more handhold assemblies 104 are provided on the frame 102. Each handhold assembly 104 includes a handhold 106 configured to be removably received within a mounting structure 108. Further, the mounting structure 108 is attached to the frame 102. Moreover, one or more handhold storage assemblies 110 are also provided on the frame 102. Each of the handhold storage assembly 110 is adapted to removably store a number of the handholds 106 as explained in detail in conjunction with FIGS. 7, 8 and 9.

FIGS. 2 to 4 illustrate perspective views of the handhold assembly 104 in different configurations. FIG. 2 illustrates a detailed structure of the handhold assembly 104 including the handhold 106, and the mounting structure 108. The handhold 106 includes a gripping member 112, and an elongate member 114 extending from the gripping member 112. In an embodiment, the handhold 106 may be made of a single tubular blank which is bent into desired structure to form the gripping member 112 and the elongate member 114. Moreover, the elongate member 114 and the gripping member 112 may be made of a hollow tube. In an embodiment, the gripping member 112 and the elongate member 114 may have a substantially circular cross-section. However, the gripping member 112 and the elongate member 114 may have any other cross-section, for example, polygonal, oval etc. Further, the gripping member 112 includes an upper portion 116, and two lateral portions 118 extending at an acute angle α from the upper portion 116. In an embodiment, the acute angle α may lie within a range from about 15 degrees to about 60 degrees. Further, curved portions 120 are provided between the upper portion 116 and the lateral portions 118. However, the gripping member 112 may have any suitable shape, for example, rectangular, circular, oval, and the like.

As illustrated in FIG. 2, a collar 122 is provided on the elongate member 114. The collar 122 aids in retaining the handhold 106 in the storage assembly 110, as described in detail with reference to FIGS. 7, 8 and 9. In an embodiment, the collar 122 may be secured on the elongate member 114 by interference fit. Further, a locking member 124 is provided at a distal portion 126 of the elongate member 114. In FIGS. 2, 3 and 4, the locking member 124 is embodied as a protrusion extending along the elongate member 114 at the distal portion 126. In an embodiment, the locking member 124 may be attached to the elongate member 114 by welding or brazing, adhesives, or any other joining methods well known in the art.

Further, an adapter 128 is provided at a distal end 130 of the elongate member 114. In an embodiment, the adapter 128 may be manufactured separately and then attached to the elongate member 114. A persons having ordinarily skilled in the art may understand that the various components of the handhold 106, for example, the elongate member 114, the gripping member 112, the collar 122, the locking member 124, and the adapter 128 may be assembled as different members, or molded or formed as a single member by well known techniques in the art. Moreover, various components of the handhold 106 may be made of a similar material or different materials. Additionally, in multiple embodiments, various components of the handhold 106 may be made of one or more steel alloys.

As illustrated in FIG. 2, the elongate member 114 is configured to be inserted into a first opening 132 of the mounting structure 108 such that the locking member 124 is aligned with a slot 134 provided on the first opening 132. In an assembled configuration, as illustrated in FIGS. 3 and 4, the locking member 124 is engaged with the slot 134. Further, in the assembled state, as illustrated in FIG. 4, the adapter 128 extends beyond the mounting structure 108 in the handhold assembly 104.

FIGS. 5 and 6 illustrate detailed views of the distal portion 126 of the elongate member 114, and the mounting structure 108, respectively. As illustrated in FIG. 5, the adapter 128 includes a tapered portion 136 and a straight portion 138. The straight portion 138 may be inserted into the distal end 130 of the elongate member 114. In an embodiment, the straight portion 138 may form an interference fit with the elongate member 114.

As illustrated in FIG. 6, the mounting structure 108 includes an upper member 140, a lower member 142, and a connecting member 144 disposed between the upper member 140 and the lower member 142. The upper member 140 and the lower member 142 include the first opening 132 and a second opening 146, respectively. Further, the first opening 132 and the second opening 146 may have a diameter slightly greater than the outer diameter of the elongated member 114. In some embodiments, another slot may be provided in the second opening 146, the other slot being aligned with the slot 134. Further, the upper member 140, the lower member 142 and the connecting member 144 define lateral openings 148 and side supports 150 are provided on the lateral openings 148. The side supports 150 also include openings in alignment with the lateral openings 148. Further, a fixing plate 152 is attached to the side supports 150, the upper member 140, and the lower member 142 substantially opposite to the connecting member 144. The fixing plate 152 includes multiple fastening apertures 154 for attaching the mounting structure 108 to the frame 102 via mechanical fasteners (not shown). Alternatively, the mounting structure 108 may be attached to the frame 102 by welding, brazing, adhesives, or any other joining methods well known in the art. A persons having ordinarily skilled in the art may understand that the various components of the mounting structure 108, for example, the side supports 150, and the fixing plate 152 may be assembled as different members, or molded or formed as a single member by well known techniques in the art.

The elongate member 114 may be inserted through the first and second openings 132, 146 of the mounting structure 108. The locking member 124 and the slot 134 may have complementary shapes for engagement during insertion of the elongate member 114. The locking member 124 and the slot 134 are embodied as a protrusion and a receiving aperture respectively. Further, the locking member 124 and the slot 134 are embodied as having complementary rectangular cross-sections. However, in various embodiments, the locking member 124 and the slot 134 may have complementary polygonal, oval, or any other cross-sections.

Figure 7:
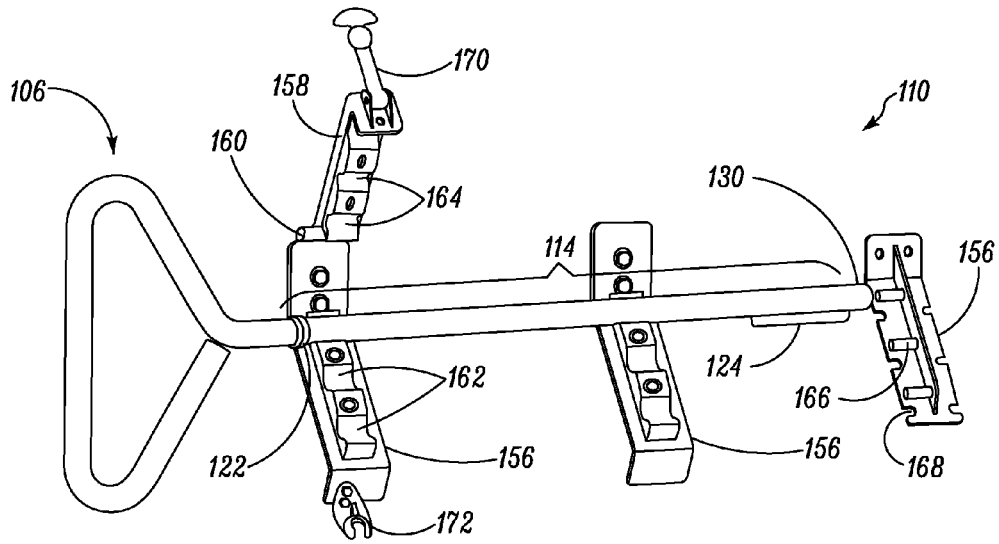
FIGS. 7-9 illustrate a storage assembly for a handhold, according to an aspect of the present disclosure.
Figure 8:
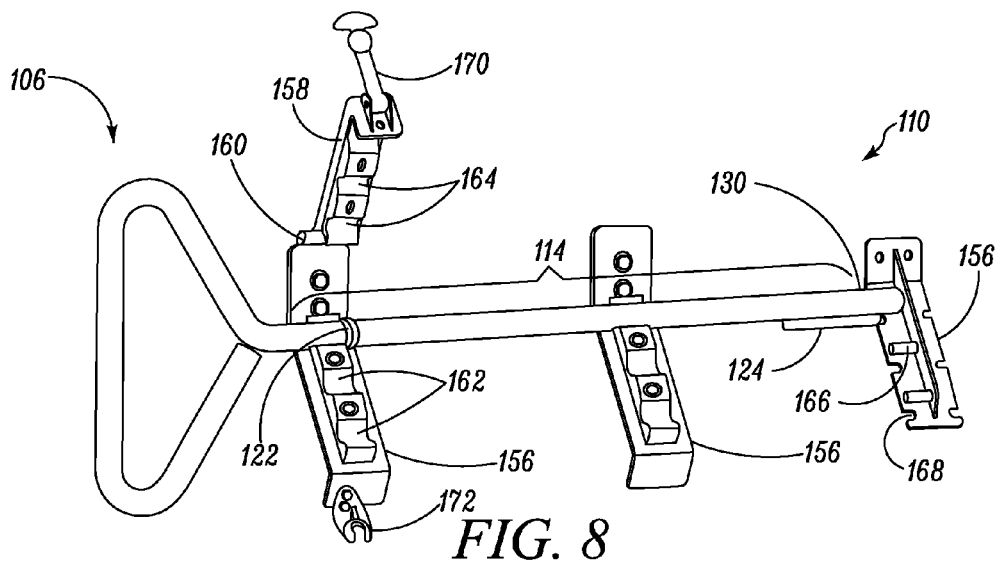
Figure 9:
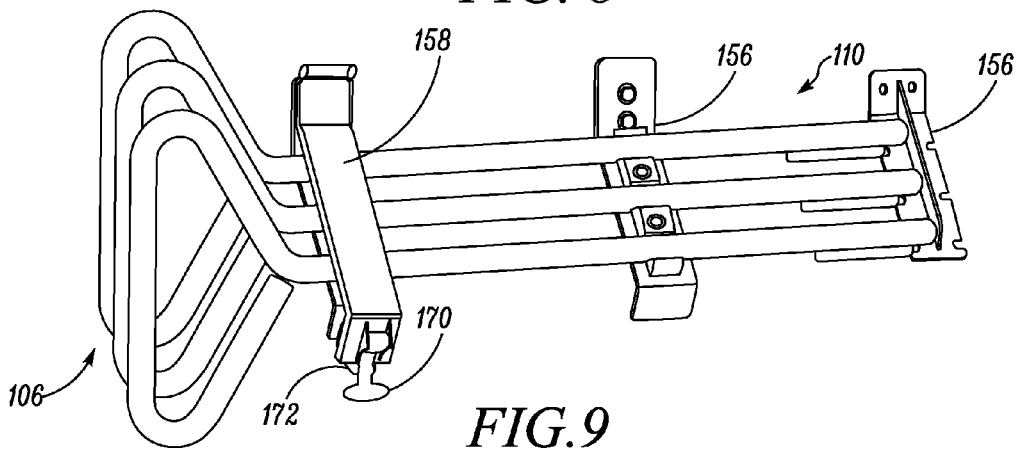

Referring now to FIGS. 7, 8 and 9, the storage assembly 110 is further explained in detail, in accordance with an embodiment the present disclosure. As shown in the FIGS. 7-9, the storage assembly 110 is used to securely store of one or more handholds 106. The storage assembly 110 includes one or more fixed members 156, and a movable member 158. The movable member 158 is pivotally connected to at least one of the fixed members 156 by a hinge connection 160. Each of the fixed members 156 includes cutouts 162. The movable member 158 may also includes complementary cutouts 164. According to an aspect of the present disclosure, the cutouts 162 and 164 are provided on elastomeric members, such as rubber, to resiliently secure the handholds 106. Further, one of the fixed members 156 includes a receiving member 166, and a slot 168.

As illustrated in FIG. 8, after the handhold 106 is positioned in the storage assembly 110, the elongate member 114 of the handhold 106 engages with the cutouts 162 of the fixed member 156. Further, the collar 122 of the handhold 106 engages with one of the cutouts 162 provided on the fixed members 156. The locking member 124 engages the slot 168 of the fixed member 156. Moreover, the distal end 130 of the elongate member 114 engages with the receiving member 166.

As illustrated in FIGS. 7 and 8, the movable member 158 includes a latching member 170 adapted to removably engage with a securing member 172 provided on the fixed member 156 of the storage assembly 110. In the latched condition, as illustrated in FIG. 9, the latching member 170 may be resiliently secured to the securing member 172. Thus, the elongate member 114 may also be resiliently secured between the cutouts 162 and the complementary cutouts 164 provided on the fixed member 156 and the movable member 158, respectively.

Figure 11:
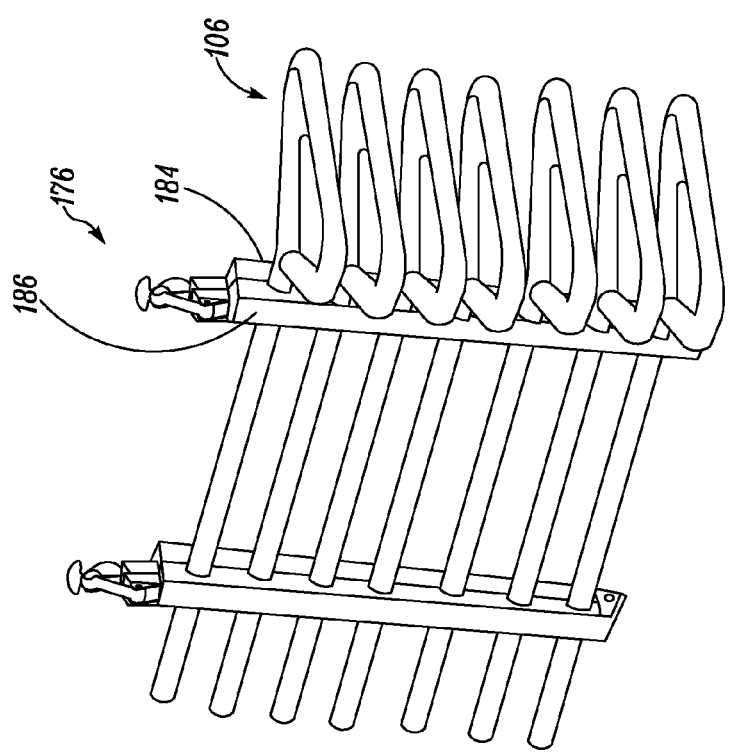
FIG. 11 illustrates a storage assembly for the handhold, according to yet another aspect of the present disclosure.
Figure 10:
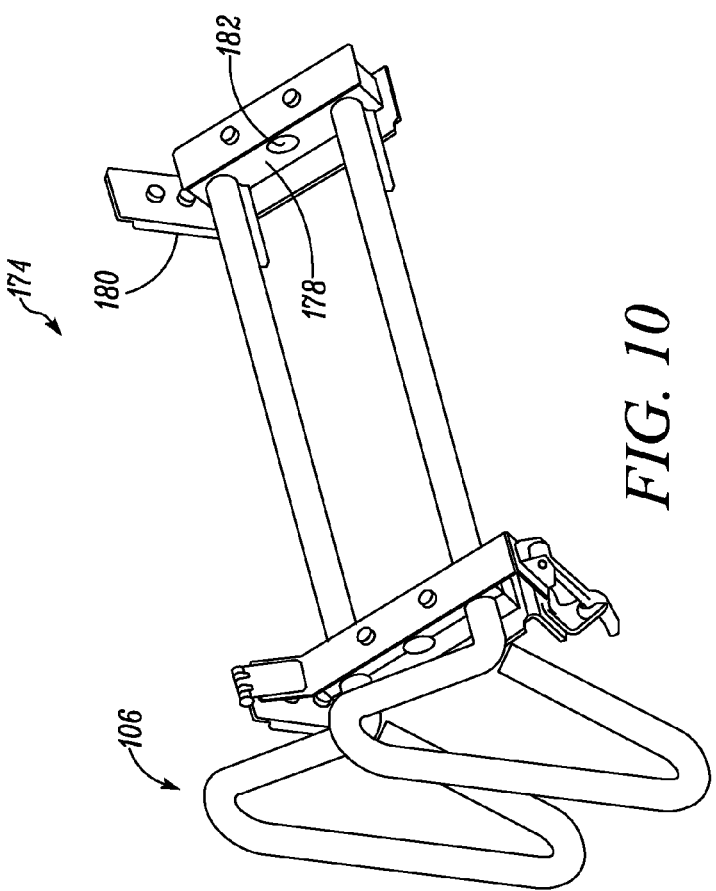
FIG. 10 illustrates a storage assembly for the handhold, according to another aspect of the present disclosure.

FIGS. 10 and 11 illustrate storage assemblies 174 and 176 according to various other embodiments of the present disclosure. As illustrated in FIG. 10, instead of the receiving member 166, and the slot 168 (as shown in FIGS. 7 and 8), the storage assembly 174 may include an elastomeric block 178, such as rubber block, fixedly attached with a fixed member 180. Further, one or more grommets 182 are provided on the elastomeric block 178, such that the grommets 182 are configured to receive the distal end 130 of the handholds 106.

Moreover, as illustrated in FIG. 11, the storage assembly 176 also includes a fixed member 184 and a movable member 186 having cutouts and complementary cutouts, respectively. The movable member 184 is pivotally attached with the fixed member 186 to facilitate storage and removal of the handholds 106. It may be apparent to a person having ordinary skill in the art that the storage assemblies 110 or 174, or 176 may be attached to the machine chassis 100 by any well know technique in the art, such as welding, fastening, and the like.

INDUSTRIAL APPLICABILITY

During maintenance operation on the machine chassis 100, the handholds 106 are positioned in a manner that allows servicing personnel to traverse across the machine chassis 100 while keeping three points of contact to the machine chassis 100. Referring to FIG. 1, the personnel may use one or more handholds 106 from the storage assembly 110 or 174 for travelling across to the rear of the machine chassis 100. The handholds 106 are portable modular structures which are made of light weight steel alloys and are easily detachable from the storage assembly 110. Further, gripping member 112 assists the operator to firmly hold the handhold 106 while moving across the frame 102.

As shown in the FIGS. 2-4, the locking member 124 provided at the distal portion 126 of the handhold 106, is adapted to align into the slot 134 provided on the mounting structure 108. The slot 134 restricts the locking member 124, thus preventing any rotational movement of the handhold 106 and also supports the handhold 106 vertically. Further, this anti-rotational feature of the handhold 106 may provide firm gripping for the personnel. The tapered portion 136 of the adapter 128 easily protrudes through the second opening 146 of the mounting structure 108. Thus, the handhold 106 is resistant to being accidentally removed by side forces. Referring to FIG. 5, the tapered portion 136 of the adapter 128 may help in easy installation of the handhold 106 into the mounting structure 108. Moreover, as shown in FIG. 6, the lateral openings 148 may prevent debris accumulation within the mounting structure 108.

As illustrated in FIGS. 7-9, the storage assembly 110 may be provided on the machine chassis 100, which may be accessible to the operator. The elongate member 114 of the handhold 106 is inserted into the receiving member 166 of the fixed member 156 of the storage assembly 110. Further, the slot 168 in the fixed member 156 receives the locking member 124 and prevents the handhold 106 from rotation during storage. Further, the collar 122 of the handhold 106 is adapted to be received into the cutouts 162 on the fixed member 156 of the storage assembly 110, thus the handholds 106 may be prevented from rattling movement. Further, the movable member 158 of the storage assembly 110 may adapt a latching member 170 for connecting with the securing member 172 provided on the fixed member 156, thereby securing the handholds 106 in the storage position.

During installation, the personnel may remove the handhold 106 from the storage assembly 110, and then insert the handhold 106 onto the mounting structure 108 located on the frame 102 of the machine chassis 100. Further, after installing the handhold 106, the personnel would then mount another handhold 106 in the same manner. The handholds 106 are positioned in such a manner that allows the service personnel to traverse the rear of the machine chassis 100 while keeping three points of contact to the machine chassis 100.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A handhold assembly for a machine chassis comprising:
   a handhold, the handhold including:
      a gripping member;
      an elongate member extending from the gripping member;
      a locking member provided at a distal portion of the elongate member; and
      an adapter provided at a distal end of the elongate member; and
   a mounting structure configured to be attached with the machine chassis, the mounting structure including:
      a first opening and a second opening, the first and the second openings configured to removably receive the elongate member and the adapter, respectively; and
      a slot provided on the first opening, the slot configured to engage with the locking member provided at the distal portion of the elongate member;
      an upper member including the first opening;
      a lower member including the second opening;
      a connecting member disposed between the upper member and the lower member, the upper member, the lower member and the connecting member define lateral openings; and
      a fixing plate disposed substantially opposite to the connecting member.

2. The handhold assembly according to claim 1, wherein the gripping member includes:
   an upper portion;
   two lateral portions extending from the upper portion, the two lateral portions being extending at an acute angle relative to the upper part; and
   the elongate member extends from one of the two lateral portions.

3. The handhold assembly according to claim 1, wherein the locking member include a protrusion extending along the elongate member at the distal portion.

4. The handhold assembly according to claim 1, wherein the adapter includes a tapered portion and a straight portion, the straight portion is configured to be inserted into the elongate member at the distal end.

5. The handhold assembly according to claim 4, wherein the tapered portion is configured to extend within the second opening of the mounting structure.

6. The handhold assembly according to claim 1, wherein the fixing plate is configured to be attached with a frame of the machine chassis.

7. A machine chassis comprising:
   a frame;
   a mounting structure attached to the frame, the mounting structure including:
      a first opening and a second opening; and
      a slot provided on the first opening;
      an upper member including the first opening;
      a lower member including the second opening;
      a connecting member disposed between the upper member and the lower member, the upper member, the lower member and the connecting member define lateral openings; and
      a fixing plate disposed substantially opposite to the connecting member; and
   a handhold including:
      a gripping member;
      an elongate member extending from the gripping portion,
      a locking member provided at a distal portion of the elongate member, the locking member configured to engage with the slot provided on the first opening; and
      an adapter provided at a distal end of the elongate member, the elongate member and the adapter configured to be removably received within the first and second openings of the mounting structure, respectively.

8. The machine chassis according to claim 7, wherein the gripping member includes:
   an upper portion;
   two lateral portions extending from the upper portion, the two lateral portions being extending at an acute angle relative to the upper part; and
   the elongate member extends from one of the two lateral portions.

9. The machine chassis according to claim 7, wherein the locking member include a protrusion extending along the elongate member at the distal portion.

10. The machine chassis according to claim 7, wherein the adapter includes a tapered portion and a straight portion, the straight portion is inserted into the elongate member at the distal end.

11. The machine chassis according to claim 10, wherein the tapered portion is extended within the second opening of the mounting structure.

12. The machine chassis according to claim 7, wherein the fixing plate is attached with a frame of the machine chassis using the fastening apertures.

13. The machine chassis according to claim 7 further includes a storage assembly configured to store the handhold, the storage assembly including:
- a fixed member, the fixed member have a plurality of cutouts and a securing member, the cutouts are configured to engage with the elongated member of the handhold; and
- a movable member pivotally connected to the fixed member, the movable member have a plurality of complementary cutouts and a latching member; the latching member is configured to removably engage with the securing member to resiliently secure the elongated member between the cutouts.

14. The machine chassis according to claim 13, wherein the fixed member includes a receiving member configured to receive the distal end of the elongate member.

15. The machine chassis according to claim 13, wherein the fixed member further includes a slot for receiving the locking member of the handhold member.

\* \* \* \* \*